Dec. 16, 1947.  J. B. BROWN  2,432,721
STEERING GEAR CONTROL
Filed March 30, 1944  3 Sheets-Sheet 1

INVENTOR
BY JESSE B. BROWN
Cecil F Ouens
ATTORNEY

Dec. 16, 1947.    J. B. BROWN    2,432,721
STEERING GEAR CONTROL
Filed March 30, 1944    3 Sheets-Sheet 2

INVENTOR
JESSE B. BROWN
BY Cecil F. Arens
ATTORNEY

Dec. 16, 1947.    J. B. BROWN    2,432,721
STEERING GEAR CONTROL
Filed March 30, 1944    3 Sheets-Sheet 3
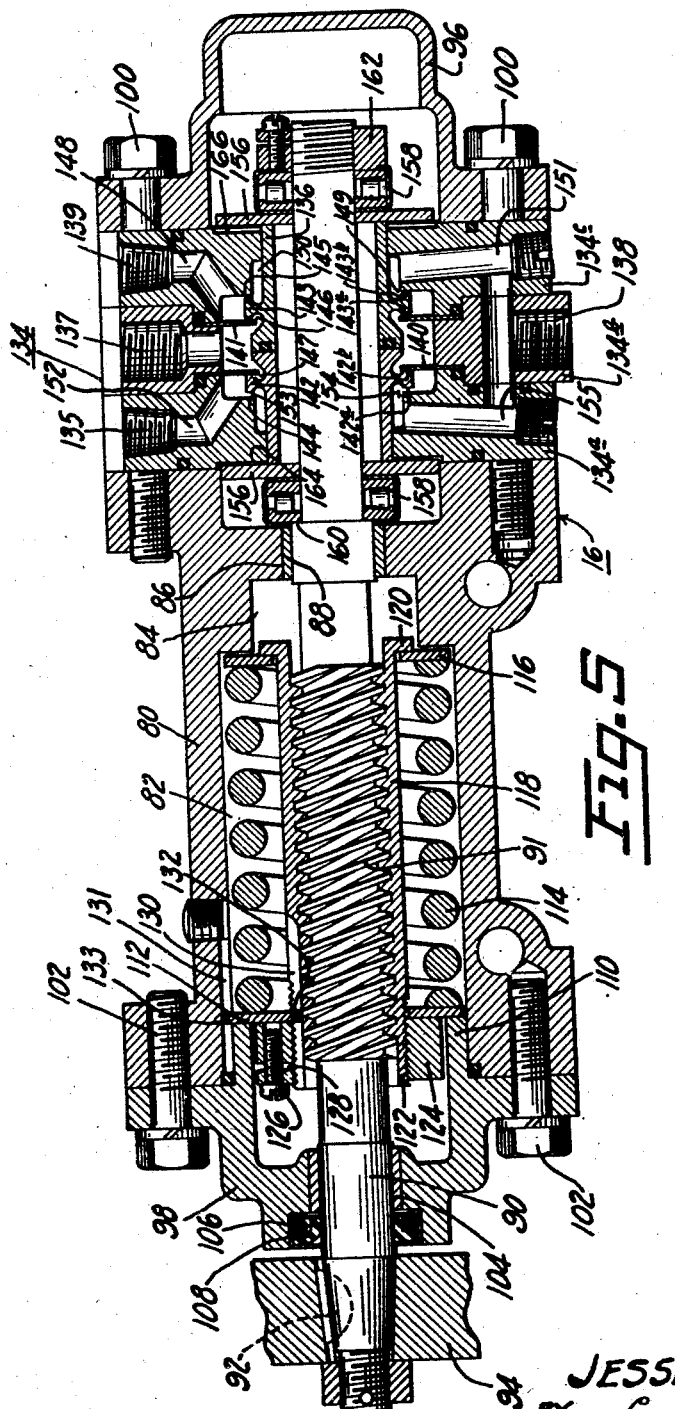
INVENTOR
JESSE B. BROWN
BY Cecil F. Arens
ATTORNEY Patented Dec. 16, 1947

2,432,721

UNITED STATES PATENT OFFICE 2,432,721

STEERING GEAR CONTROL

Jesse B. Brown, South Bend, Ind., assignor to Bendix Aviation Corporation, South Bend, Ind., a corporation of Delaware Application March 30, 1944, Serial No. 528,698

10 Claims. (Cl. 121—41)

1

This invention relates to power steering means, and more particularly to steering means of the remote control type for use on vehicles such as tractors, diggers, road machinery, tanks and the like.

In certain types of vehicles or road machinery it is difficult as well as impracticable to obtain a mechanical linkage between the steering control wheel and the steered members for directing the vehicle or road machine on its course. Grading machines, for example, are sometimes attached to a prime mover in which an operator is seated several feet to the rear where mechanical means for steering the grader would not be feasible. Also, on digging machines of the type having a rotatable cab it has always been a problem of much concern in the industry to provide a steering mechanism for the machine that would not be too complex.

It is a purpose of the present invention to provide a hydraulic steering system in which an operator positioned remotely from the steered members of a vehicle may control said vehicle on its course.

It is an object of the invention to provide a steering system for vehicles having a minimum of mechanical linkage.

Another object of the invention lies in the provision of a power operated steering system which produces an opposing or reactionary force tending to preclude continued movement of the steered members.

A still further object is to provide a power steering system for vehicles which produces a reactionary force opposing the movement of the steered members, said reactionary force having a magnitude which varies depending upon the position of the steered members from their normal position.

Another important object of this invention is to provide a steering valve adapted to equalize the fluid pressure on the system at times when steering is not required.

Other objects and advantages of the hydraulic steering system will become apparent to those skilled in the art from a study of the drawings and description to be presently set forth.

In the drawings:

Figure 5 is a longitudinal sectional view of the steering valve of this invention showing the relative position of the parts upon rotation of the steering wheel.

Figure 1:
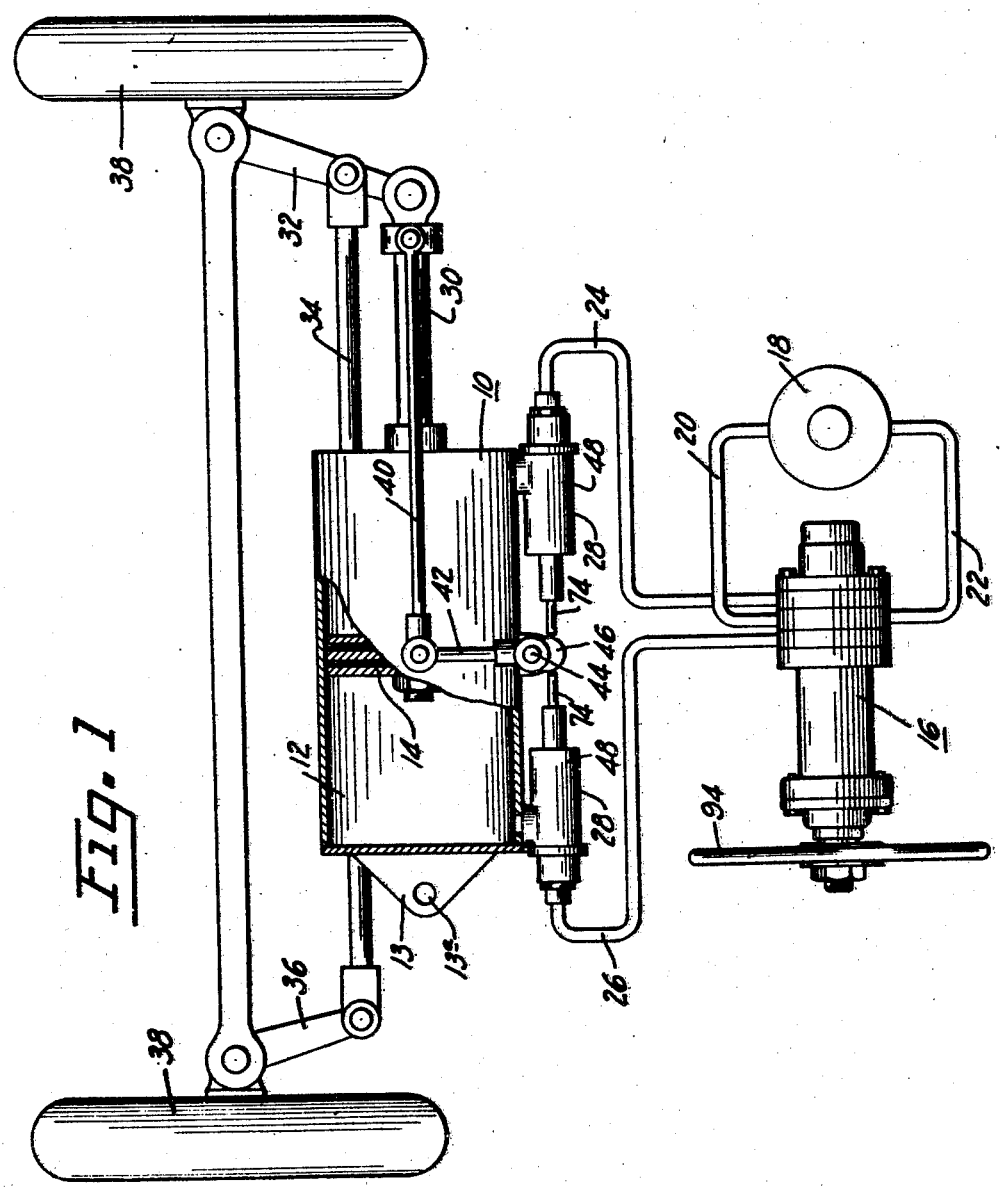
Figure 1 is a diagrammatic view of the remote control hydraulic steering system of this invention applied to the steering wheels of a vehicle.

The remote control hydraulic steering system of this invention is shown in Figure 1 and includes a motor unit 10 comprising a cylinder 12 having a reciprocable piston 14 disposed therein. The motor unit 10 has integral therewith a bracket 13 provided with a hole 13a adapted to receive a pin, not shown, for pivotally securing the cylinder to a vehicle or machine so that full movement of the piston may be accomplished. A steering valve 16 is connected to a pump 18 through conduits 20 and 22. The pump 18 may be driven by the engine of the vehicle, not shown, or operated independently of said vehicle engine. Flexible conduits 24 and 26 connect the steering valve to the opposite ends of the cylinder 12, each conduit being provided with a control valve 28. The piston 14 is secured to a piston rod 30 which actuates a lever 32, a reach rod 34 and a lever 36 to thereby move a pair of wheels or steered members 38 as shown in the present embodiment of the invention. However, it must be recognized that the actual ground engaging means or steered members may be any of the well-known type depending upon the application and that it is not intended to limit the use of the system to that type of steered members illustrated. A linkage, comprising a rod 40 pivotaly connected to one end of a transverse lever 42 fulcrumed at 44 and having a cam 46 at its other end, connects the piston rod 30 to control valves 28 to thereby actuate said valves in accordance with the movement of the piston from its neutral or central position.

It is imperative to the operation and function of the system of this invention to provide a means that will tend to choke the flow of fluid pressure to one side of the piston and allow the fluid to escape unimpeded from the other side thereof in response to movement of the steering wheel. This enables the operator of the vehicle to exercise greater control over steering since each turn of the steering wheel will move the wheels a predetermined amount only, dependent upon the force exerted on the steering wheel by the operator. If continued turning of the vehicle wheels is desired the steering wheel must be rotated in the conventional manner. The means which I provide for performing this function comprises a pair of control valves 28. This arrangement, which as pointed out hereinafter is adapted to supply a reactionary force opposed to continued movement of the piston, enables the vehicle to be steered in increments and insures a positive control over the vehicle. Since the control valves 28 are identical only one will be described. The valve comprises a body portion 48 having an opening 50 communicating with the cylinder 12. A valve housing 52 threadedly engages the body portion 48 and is provided with an interiorly threaded portion 54 adapted to receive the conduits 24 or 26 to connect the steering valve 16 with one or the other of control valves 28. The valve housing has an integral prolongation 56 extending into the body portion 48 beyond the opening 50 which communicates with the cylinder 12. A valve element 58 having a passage 60 therethrough is slidably disposed in the housing 52 and normally biased to closed position, against a seat 59 formed in said housing, by a spring 62 to thereby prevent at times the passage of fluid to said cylinder. Radial openings 64 are circumferentially spaced about the valve housing to permit fluid under pressure to enter the cylinder from the control valve when the valve element 58 is in an open position. The passage 60 is enlarged at 66 to receive a spring 68 adapted to hold a ball check-valve 70 against a seat 72 formed at the junction of the enlarged passage 66 and passage 60. The ball check-valve permits fluid from the interior of the cylinder 12 to escape through the passages 60 and 66 to the system by not vice versa. A push pin 74 having a circular plate portion 76 slidable in the body 48 is guided by a bearing portion 78 integral with the body 48. The push pin 74 is actuated by the cam 46 which forces the valve element 58 toward its seat 59 with a force the magnitude of which is dependent upon the rotation of the cam the rotation of the cam being dependent upon the displacement of the piston from its normally central position.

For steering the vehicle to which the hydraulic steering system of this invention is connected, a steering valve 16 is provided. This valve includes a body portion 80 having a longitudinal bore 82 reduced at 84 and 86 for a purpose to be presently described. The reduced portion 86 has a bearing 88 secured therein adapted to receive a steering shaft 90 having an intermediately threaded portion 91. To one end of the shaft is keyed, at 92, a steering wheel 94. It should be noted that the threads of the threaded portion 91 have such a lead that any axial force applied to the shaft at the end opposite the steering wheel will cause rotation of the steering wheel. In the present embodiment a triple thread is provided to obtain the desired results. The ends of the valve are sealed by caps 96 and 98 secured to the body 80 in any suitable manner such as by bolts 100 and 102 respectively. Cap 98 also provides a second bearing member 104 for the steering shaft 90. An annular recess 106, in the cap 98 is adapted to receive an oil seal 108 which retains the oil in the bore 82. An integral pilot-like extension 110 of the cap 98 protrudes into the bore 82 and provides an abutment for a washer 112 which is urged against the extension 110 by a spring 114. A washer 116 engages the other end of the spring and abuts the shoulder formed by the reduced portion 84 of the bore. An interiorly threaded sleeve member or nut 118, having a flanged portion 120 and an exteriorly threaded portion 122, engages the intermediately threaded portion 91 of the steering shaft 90. A collar 124 threadedly engages the sleeve portion 122 and is locked thereto by set screw 126 which passes through a slotted portion 128 of the collar. The sleeve member 118 is provided with a keyway 130 and the body 80 with a keyway 131 adapted respectively to cooperate with keys 132 and 133 which are integral parts of the washer 112. This keyway arrangement insures axial or longitudinal movement of the sleeve 118 with respect to the steering shaft 90 and prevents the sleeve from revolving with the steering shaft when the steering wheel is rotated.

For controlling the flow of fluid under pressure from the source to the steering mechanism the steering valve 16 embraces a valve assembly 134 disposed between the body 80 and cap 96, having a member 136 nested therein and adapted for slight axial movement. Assembly 134 is removably secured between the cap 96 and body portion 80 by the bolts 100. The illustrated embodiment of valve member 134 comprises sections 134a, 134b and 134c in juxtaposition, which include respectively a cylinder port 135, an inlet port 137 and outlet port 138, and a cylinder port 139. Axially and circumferentially spaced relative to the member 136 are valve seat engaging elements or discs 140 and 141 secured between section 134b and sections 134a and 134c respectively, adapted to cooperate with annular members 142 and 143 of the member 136 to thereby regulate the flow of fluid from the inlet to the outlet and/or to the cylinder ports. The annular members 142 and 143 form valve seats or faces 142a, 142b and 143a, 143b respectively. The elements or flat rings 140 and 141 which are preferably made of a resilient or flexible material such as spring steel, form partitions separating the inlet 137 from the cylinder ports and from the outlet except that communication to these ports is at times provided through passages 146 and 147 when the member 136 is axially centered with respect to the valve member 134. When the member 136 is moved to an extreme right position, as shown in Figure 5, the face or valve seat 143b is adapted to seat against an annular seating surface 145 of the section 134c. In this position face 142b engages the valve seat engaging element 140. An extreme left position of the member 136 will cause the face or seat 142a to seat against the annular seating surface 144 of the section 134a; and face 143a engages the valve seat engaging element 141. Passages 148, 149, annular passage 150 and passage 151 connect the cylinder port 139 to outlet port 138. Likewise passages 152, 153, annular passage 154 and passage 155 connect the cylinder port 135 to outlet port 138.

The member 136 which extends axially of shaft 90 is engaged at its ends by a pair of substantially flat circular elements 156 which elements extend radially from member 136 and are adapted to engage the valve member 134. A frictionless element or thrust bearing 156 is secured between shoulder 160 of the shaft 90 and the element 156. A second thrust bearing 158 near the end of shaft 90 is disposed between one of the elements 156 and a lock nut 162. The lock nut 162 is adapted for axial adjustment on the shaft to secure the bearings 158 into frictional engagement with the elements 156 and with the shoulder 160 and collar 162 respectively. This bearing arrangement permits free rotation of shaft 90 with respect to member 136, but any axial displacement of the shaft results in a like movement of member 136. The sections 134a and 134c are recessed at 164 and 166 respectively, for the reception of the elements 156.

Figure 2:
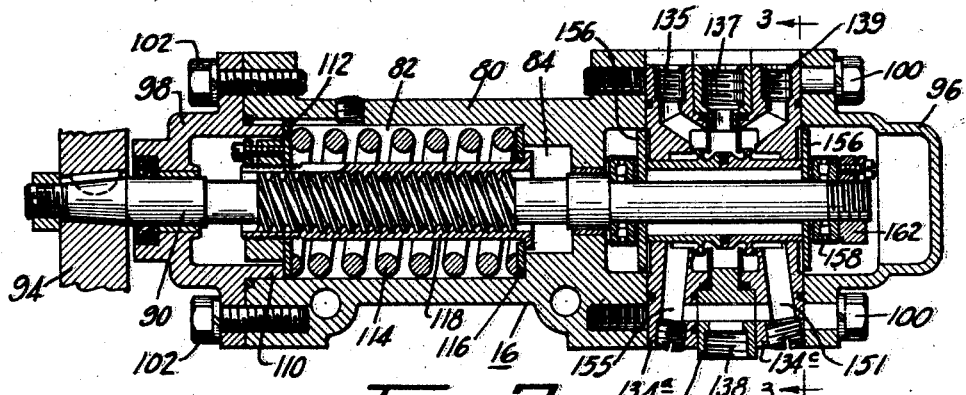
Figure 2 is a longitudinal sectional view in elevation of the steering valve of the system shown in Figure 1.
Figure 3:
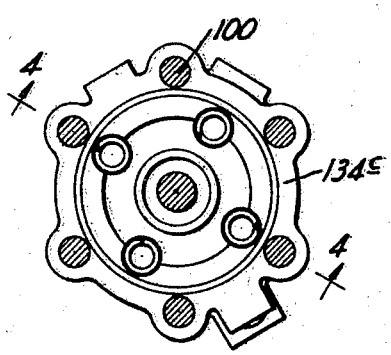
Figure 3 is a view in section taken on the line 3—3 of Figure 2.
Figure 4:
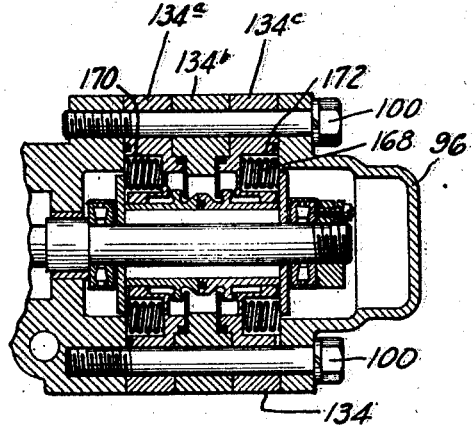
Figure 4 is a section taken on the line 4—4 of Figure 3 showing the valve member centering springs.

For centering the member 136, as shown in Figures 2 and 4, so that the passages 146, 147, 149 and 153 will have the same cross-sectional area eight springs 168 are provided. At this time, when member 136 is centered there will be an equal amount of fluid passing from the inlet 137 through the passages 146 and 147 respectively. The springs 168 are radially disposed relative to the steering shaft axis in apertures 170 and 172 of sections 134a and 134c respectively, and are suited to engage the elements 156 to thereby urge member 136 to a neutral or central position. The four springs 168 which act together on one of the elements 156 are weaker than the spring 114 which acts on the sleeve member 118.

The valve used herein is known in the art as an "open valve." The valve has a normally neutral position in which it permits a continuous flow of fluid from the inlet to the outlet through a plurality of paths.

Since the resistance offered to steering in systems of the remote control type is not transmitted to the steering wheel controlled by an operator, some means should be provided whereby an artificial "feel" of the car is communicated to the operator so that steering will seem more natural. Without "feel" the steering wheel has a disjointed feeling such as would be experienced if a steering wheel connected to a strictly manually operated vehicle were disconnected from the steered members. This "feel" is obtained in the valve of this invention by the spring 114 which is adapted to load the shaft 90 through the sleeve 118 and threaded portion 91 of the shaft. The greater the angular displacement of the steering wheel the greater the deflection of the vehicle wheels and the greater the effort demanded of the operator to turn the steering wheel.

Operation of the steering valve is as follows:

Any slight initial movement of the steering wheel, by the operator to his right, turns the shaft 90 in the sleeve member 118 and at the same time tends to move the shaft 90 axially to the right as viewed in Figure 2. Continued rotation of the wheel in the same direction will shift the shaft axially to the right to thereby cause the member 136, including the valve seats 142 and 143, to be moved to the right. Movement of member 136 changes the areas of the passages 146, 147, 149 and 153 with a consequent change in fluid flow through these passages. A shift to the right of member 136 will enlarge the passage 146 to thereby increase the flow of fluid to the cylinder port 139, and will reduce the passage 147, to thereby decrease the fluid flow to cylinder port 135. Simultaneously the passage 149 is reduced in area to thereby impede the flow of fluid pressure to the outlet 138 and the passage 153 is expanded to allow a greater amount of fluid to pass to the outlet 138. This movement of member 136 in an axial direction is against the four springs 168 disposed in section 134a acting on the element 156. It should be noted that although the shaft 90 rotates and moves axially about its own axis the member 136 is urged in an axial direction only. The frictionless elements 158, which are interposed against the shoulder 160 of the shaft 90 and the lock nut 162, convert the rotational and axial movement of the shaft 90 into strict axial movement of member 136. Movement of member 136 to the right compresses the springs 168 in section 134a. Continued movement of shaft 90 to the right against springs 168 builds up additional force in the springs acting axially on the shaft tending to urge it to the left. However, the force built up by compressing springs 168 is only slight and is intended primarily to return member 136 to its central position when the steering valve is not being used. Obviously any shift to the left of sleeve member 118 caused by rotational and/or axial movement of shaft 90 will carry with it the washer 116 which will cause spring 114 to compress, that is, the spring will be loaded. The position assumed by the parts of valve 16 when the steered members 38 are turned to the right is best shown in Figure 5. Where there is an axial thrust applied to shaft 90 as through axial movement of member 136, rotational as well as axial movement is imparted to shaft 90; that is, if the steering wheel is released strict axial movement of member 136 is converted into rotational and axial movement of shaft 90 which threads the nut 118 onto the shaft. However, if the steering wheel is held against rotation, any axial thrust of shaft 90, caused by axial movement of member 136 in response to a reactionary force transmitted to said member, will only shift the shaft axially against the load spring 114. It can be readily observed that as the reactionary force acting on member 140 becomes larger spring 114 is compressed to a greater degree. This increased loading of spring 114 will necessitate greater effort by the operator to continue rotation of the steering wheel in the direction initiated.

Figure 6:
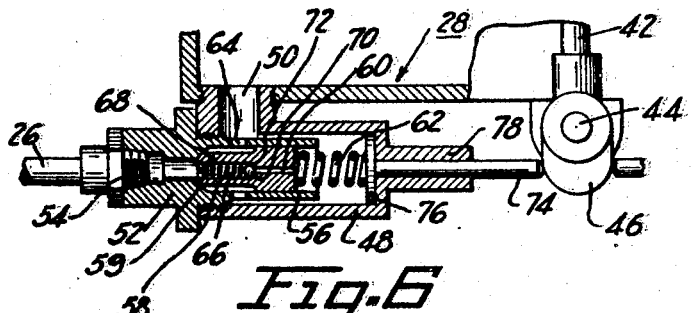
Figure 6 is a horizontal section of one of the control valve 28 of Figure 1 shown associated with other parts of the system.

Operation of the remote control hydraulic steering system is as follows:

Assuming a condition at any instant when the vehicle wheels are aligned so as to cause the vehicle to steer straight ahead, the position of the piston 14 and levers connecting the vehicle wheels will be as shown in Figure 1. For the position of the parts of the steering valve and control valve at this time see Figures 2 and 6 respectively. At this instant, that is, with the valves in the position shown in Figures 2 and 6, the fluid admitted to the inlet 137 divides equally between the two parallel paths formed by passages 146, 149, 150, 151 and 147, 153, 154, 155 respectively. These two paths are reunited at the outlet 138 where the fluid pressure returns unimpeded to the pump. Obviously with this relationship of passages, where there is an equal passage of fluid, there is a balanced condition of member 134. Under balanced conditions the pump 18 is only circulating the fluid through the steering valve 16 and the conduits 20 and 22.

Should the operator of the vehicle or dirigible machine wish to negotiate a turn to the right, that is, deflect the steered members 38 to the right, as viewed in Figure 1 he will only have to rotate the steering wheel 94 to his right. Rotation of the steering wheel to the operator's right, as previously described in the operation of the valve, produces an axial displacement of member 136 to the right. Axial displacement of the member 136 disturbs the equality of flow through the passages 146 and 147. In the instant example where the displacement of member 136 is to the right as best shown in Figure 5, passage 146 is enlarged to permit increased flow to the right side of piston 14 and passage 147 is reduced to obstruct the flow of fluid to the left side of piston 14. However, passage 153 is made greater to allow the flow of fluid from the left side of piston 14 to the outlet with a minimum amount of obstruction. Passage 149 is constricted to prevent the increased flow to the cylinder port 139 from by-passing to the outlet 138. This increased flow to the right side of the piston 14 is through conduit 24, past the valve element 58 and radial openings 64. The flow to the right end of cylinder 12 will effect movement of the piston to the left to thereby deflect the vehicle wheels and actuate the push pin 74 of the control valve on the right which is connected to conduit 24. Actuation of push pin 74 compresses a spring 62 which urges valve element 58 against valve seat 59 to increase the resistance to the flow of fluid to the right end of cylinder 12. This resistance to flow is proportionate to the displacement of the piston from its center or neutral position. Increasing the resistance to the flow through the control valve as aforementioned causes a reactionary force to be built up in conduit 24 acting in a direction opposing the flow of fluid from cylinder port 139. This reactionary force is transmitted to the member 140 where it acts on the valve seat 142 tending to restore the member 136 to a balanced condition. As already explained movement of the member 136 axially by an axial force applied thereto is converted into rotational movement of the steering wheel whereby the wheel may be turned to its initial position. If it is desired to deflect the vehicle wheels further after the control valve has closed against the flow of fluid it will be necessary to apply a greater force than before to the steering wheel to cause additional movement of the member 136. To prevent excessive pressures in cylinder ports 135 and 139 pump 18 is provided with a built in conventional type relief valve, not shown, for relieving pressures above a predetermined value.

It is evident that as the reactionary force acting to restore the valve to balanced condition increases, the force applied at the steering wheel by the operator must also increase if a further turning of the vehicle wheels is desired.

For purpose of exemplification only the operation and function of the steering system was explained for executing a right turn. For accomplishing a left turn the steering wheel would be rotated to the left. The principles and function of operation are the same whether turning right or left.

Although the form of embodiment of the invention herein disclosed is the preferred form, it is to be understood that other forms might be adopted, coming within the scope of the appended claims.

I claim:

1. A remote control hydraulic steering system for a vehicle comprising steered members on the vehicle, a fluid motor having a piston reciprocable therein and operatively connected to said steered members for displacing them when guiding of the vehicle is desired, a manually controlled steering valve, a source of hydraulic fluid under pressure connected to the steering valve connections from opposite ends of the fluid motor to the steering valve, said steering valve having means shiftable from a normally neutral position where fluid under pressure tends to flow to both ends of the motor in equal proportions, to a position where fluid under pressure is forced into one end only of the motor and fluid is discharged from the other end of the motor to cause movement of the piston, and means, including a valve in each of the connections, for controlling the fluid in the motor, said valves normally biased to closed position and responsive to fluid under pressure from the source to open the valves, the valve in one of the connections being constructed and arranged to respond to movement of the piston in one direction for increasing the biasing force acting on said valve normally closing the same to choke the flow of fluid to the motor whereby a reactionary force is created which is transmitted through the fluid medium to the steering valve tending to oppose further operation of the steering valve.

2. A remote control hydraulic steering system for a vehicle comprising steered members on the vehicle, a fluid motor having a piston reciprocable therein and operatively connected to said steered members for displacing them when guiding of the vehicle is desired, a manually controlled steering valve, a source of hydraulic fluid under pressure connected to the steering valve, connections from opposite ends of the motor to the steering valve, said steering valve having means shiftable from a normally neutral position where fluid under pressure tends to flow to both ends of the motor simultaneously in equal proportions, to a position where fluid under pressure is forced into one end only of the motor and fluid is discharged from the other end to cause movement of the piston, and means, including a valve in each of the connections, for controlling the fluid in the motor, said valves normally biased to closed position and responsive to fluid under pressure from the source to open the valves, the valve in the connection to one end of the motor being constructed and arranged to respond to movement of the piston in one direction to increase the biasing force acting on said valve normally closing the same to choke the flow of fluid to the said one end of the motor whereby a reactionary force is created which is transmitted through the fluid medium to the steering valve tending to oppose further operation of the steering valve, the valve in the connection to the other end of the motor being constructed and arranged to permit the discharge of fluid from said other end of the motor to the system during movement of the piston toward said other end.

3. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where fluid is divided equally between the connections to cause the fluid to tend to flow into both chambers and to permit the fluid to circulate freely between the source and the steering valve, to a position where fluid under pressure tends to be forced into one only of the chambers and discharged from the other chamber to cause movement of the movable member, and means controlling the ingress and egress of fluid to the chambers, said last-named means including a valve in each of the connections, each valve being normally biased to closed position and openable in response to fluid pressure from the source, the valves being constructed and arranged so that one of the valves responds to one direction of movement of said movable member and the other valve responds to movement of the member in the opposite direction so that when fluid under pressure is admitted to one of the chambers to cause movement of the movable member in said one direction the valve in the connection to that chamber will be urged to closed position by an increased biasing force to offer greater resistance to the flow of fluid to said one chamber whereby a reactionary force is created which is transmitted through the fluid medium to the steering valve, tending to oppose further operation of the steering valve for steering in said one direction, said other valve including said means for controlling the egress of fluid from the other chamber during the aforesaid movement of the movable member.

4. In a hydraulic steering mechanism for use on a vehicle having steered elements and a steering element therefor comprising a steering valve adapted to be connected to the steering element to be operated thereby, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where the fluid is divided equally between the connections to cause the fluid to tend to flow into both chambers and to permit the fluid to circulate freely between the source and the steering valve, to a position where fluid under pressure tends to be forced into one only of the chambers and fluid discharged from the other chamber to cause movement of the movable member, and means controlling the ingress and egress of fluid to the chambers, said last-named means including a valve in each of the connections, each valve being normally biased to closed position and openable in response to fluid pressure from the source, the valves being constructed and arranged so that one of the valves responds to one direction of movement of said movable member and the other valve responds to movement of the movable member in the opposite direction so that when fluid under pressure is admitted to one of the chambers to cause movement of the movable member in said one direction the valve in the connection to that chamber will be urged to closed position by an increased biasing force to offer greater resistance to the flow of fluid to said one chamber whereby a reactionary force is created which is transmitted through the fluid medium to the steering valve, tending to oppose further operation of the steering valve for steering in said one direction, said other valve including said means for controlling the egress of fluid from the other chamber during movement of the movable member in said one direction, and when fluid under pressure is admitted to the other of the chambers and discharged from said one chamber to cause movement of the movable member in the opposite direction the valve in the connection to said other chamber will be urged to closed position by an increased biasing force to offer greater resistance to the flow of fluid to said other chamber whereby a reactionary force is created which is transmitted through the fluid medium to the steering valve tending to oppose further operation of the steering valve for steering in said opposite direction, said one valve including said means for controlling the egress of fluid from said one chamber during movement of said movable member in the opposite direction.

5. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where fluid from the source is divided equally between the connections and circulates freely between the source and the steering valve, to a position for selectively supplying one of the chambers with fluid from the source and exhausting fluid from the other chamber to cause movement of the movable member, and means controlling the ingress and egress of fluid to the chambers, said last-named means including a valve in each of the connections, each valve being normally biased to closed position and responsive to fluid under pressure from the source to open the same, the valves being constructed and arranged so that each valve is responsive to movement of the movable member in a preselected direction to cause the selected valve to be urged to closed position by an increased biasing force, whereby a reactionary force is created which is transmitted through the fluid medium back to the steering valve tending to resist further steering.

6. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where fluid from the source is divided equally between the connections and circulates freely between the source and the steering valve, to a position for selectively supplying one of the chambers with fluid from the source and exhausting fluid from the other chamber to cause movement of the movable member, means controlling the ingress and egress of fluid to the chambers, said last-named means including a valve in each of the connections, each valve being normally biased to closed position and openable in response to fluid under pressure from the source, the valves being constructed and arranged so that each valve is responsive to movement of the movable member in a preselected direction to cause the selected valve to be urged to closed position by an increased biasing force whereby a reactionary force is created which is transmitted through the fluid medium back to the steering valve tending to resist further steering, and a restricted passage associated with each valve and connected to opposite sides of its associated valve to by-pass fluid therearound at times, and a check valve in each passage normally biased to close the same and constructed and arranged therein so that fluid under pressure from the source acting in one of the chambers will hold the check valve for that chamber closed and fluid under pressure developed in the other chamber due to movement of the movable member will cause the check valve for that chamber to open during steering of the vehicle.

7. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where fluid from the source is divided equally between the connections and circulates freely between the source and the steering valve, to a position for selectively supplying one of the chambers with fluid from the source and exhausting fluid from the other chamber to cause movement of the movable member, means controlling the ingress and egress of fluid to the chambers, said last-named means including a valve in each of the connections, each valve being normally biased to closed position and openable in response to fluid under pressure from the source, the valves being constructed and arranged so that each is responsive to movement of the movable member in a preselected direction to cause the selected valve to be urged to closed position by an increased biasing force, whereby a reactionary force is created which is transmitted through the fluid medium back to the steering valve tending to resist further steering, and a linkage constructed and arranged to operatively connect the movable member to the selected valve for exerting said increased biasing force thereon.

8. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position where fluid from the source is divided equally between the connections and circulates freely between the source and the steering valve, to a position for selectively supplying one of the chambers with fluid from the source and exhausting fluid from the other chamber to cause movement of the movable member, and means controlling the ingress and egress of fluid to the chambers, said last-named means including a valve in each of the connections, each valve being normally biased to closed position and openable in response to fluid under pressure from the source, the valves being constructed and arranged so that each is responsive to movement of the movable member in a preselected direction to cause the selected valve to be urged to closed position by an increased biasing force proportional to the movement of the movable member in the selected direction, whereby a reactionary force is created which is transmitted through the fluid medium back to the steering valve tending to resist further steering.

9. In a hydraulic steering mechanism for use on a vehicle having steered elements and a steering element therefor comprising a steering valve adapted to be connected to the steering element, a source of fluid under pressure connected to the steering valve, a cylinder member, a piston member within the cylinder member forming therewith a pair of opposed chambers, one of said members being stationary, the other member being movable and adapted to be connected to the steered elements, a fluid connection from each chamber to the steering valve, said steering valve having means shiftable from a normally neutral position in which fluid from the source is freely circulated therethrough, to positions off neutral for selectively determining the chamber to which the fluid pressure source will be connected, and means controlling the ingress and egress of fluid to the chambers, said last-named means including a valve in each of the connections, each valve being normally biased to closed position and responsive to fluid under pressure from the source to open the same, the valves being constructed and arranged so that each is responsive to movement of the movable member in a preselected direction to cause the selected valve to be urged to closed position by an increased biasing force whereby a reactionary force is created which is transmitted through the fluid medium back to the steering valve tending to resist further steering.

10. A steering mechanism comprising a steering valve having means movable therein and normally biased to a neutral position, a source of fluid under pressure connected to the steering valve so that the fluid from the source freely circulates through the valve when in neutral position, a cylinder member, a piston member within the cylinder member forming therewith a pair of opposed chambers, one of said members being stationary, the other member being movable, a fluid connection from each chamber to the steering valve, said movable means being constituted to selectively control flow in the chambers so that when one of the chambers is supplied with fluid under pressure from the source the other chamber is connected so as to exhaust fluid therefrom, and vice-versa, to thereby move the movable member, and means controlling the ingress of fluid to the chambers comprising a valve in each connection, each valve being normally biased to closed position and openable in response to fluid under pressure from the source, said last-named means including mechanism responsive to the direction of movement of the movable member for actuating one or the other of the valves to increase the biasing force on the selected valve whereby an increased resistance to fluid flow is created in the fluid connection of the selected valve so that the fluid under pressure from the source will tend to restore the movable means, said last named means also controlling the egress of fluid from the chambers.

JESSE B. BROWN.

REFERENCES CITED

The following references are of record in the file of this patent:

UNITED STATES PATENTS

| Number | Name | Date |
| --- | --- | --- |
| 2,022,698 | Vickers | Dec. 3, 1935 |
| 2,321,377 | French | June 8, 1943 |
| 2,260,979 | Morin | Oct. 28, 1941 |
| 2,307,585 | Harrington | Jan. 5, 1943 |
| 1,914,267 | Leupold | June 13, 1933 |
| 2,069,540 | Sanford | Feb. 2, 1937 |
| 2,213,271 | Davis | Sept. 3, 1940 |
| 2,062,485 | Turek | Dec. 1, 1936 |